US006675406B2

(12) United States Patent
Ball

(10) Patent No.: US 6,675,406 B2
(45) Date of Patent: Jan. 13, 2004

(54) OVERFLOW ASSEMBLY FOR BATHTUBS AND THE LIKE

(75) Inventor: William T. Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 10/229,533

(22) Filed: Aug. 28, 2002

(65) Prior Publication Data

US 2003/0000012 A1 Jan. 2, 2003

Related U.S. Application Data

(63) Continuation of application No. 09/593,724, filed on Jun. 13, 2000, now abandoned.

(51) Int. Cl.[7] .............................................. E03C 1/232
(52) U.S. Cl. ...................... 4/683; 4/679; 4/694; 285/3
(58) Field of Search .......................... 4/651, 679, 680, 4/683, 684, 685, 694; 285/3; 138/90; 73/49.1

(56) References Cited

U.S. PATENT DOCUMENTS

| | | | | |
|---|---|---|---|---|
| 843,968 A | * | 2/1907 | Sharp, Jr. ................ | 4/694 X |
| 1,213,466 A | | 1/1917 | Delanoy et al. ............ | 285/3 |
| 1,330,909 A | * | 2/1920 | Sharp, Jr. ................ | 4/684 |
| 2,223,365 A | * | 12/1940 | Groeniger .................. | 4/683 |
| 4,307,901 A | | 12/1981 | Orberg et al. .............. | 285/3 |
| 4,359,790 A | | 11/1982 | Chalberg .................. | 4/679 X |
| 5,890,241 A | | 4/1999 | Ball .......................... | 4/679 X |
| 6,192,531 B1 | * | 2/2001 | Fritz et al. ................ | 4/679 |

FOREIGN PATENT DOCUMENTS

| | | | | |
|---|---|---|---|---|
| CH | 346187 | * | 6/1960 | .................... 4/679 |
| DE | 1163257 | | 2/1964 | .................... 4/679 |
| FR | 744099 | * | 4/1933 | .................... 4/684 |

OTHER PUBLICATIONS

English language translation of CH 346,187.*

* cited by examiner

Primary Examiner—Robert M. Petsuga

(57) ABSTRACT

An overflow system in the bathtub has an overflow port and has a drain pipe in connection with the overflow port. A threaded flange has a stub shoulder on one end which is forced-fitted into a circular sleeve on the overflow port. The threaded flange has exterior threads on its outer surface and a thin diaphragm secured to the end thereof opposite to the stub shoulder. A large sealing washer embraces the outside of the circular flange on the overflow port and extends partially over the threads of the threaded flange. A large internally threaded nut is threadably mounted on the outer end of the threaded flange and compresses the sealing washer against a vertical flange on the port to seal the connection between the threaded flange and the port. A decorative cap is frictionally snapped into engagement with protrusions on the outer surface of the nut. The cap can be removed when needed to permit the plumber to gain access to the diaphragm to cut it open for fluid flow after they system has been tested for leaks, or put in place after the cut takes place.

1 Claim, 5 Drawing Sheets

OVERFLOW ASSEMBLY FOR BATHTUBS AND THE LIKE

CROSS REFERENCE TO RELATED APPLICATION

This application is a continuation of U.S. patent application Ser. No. 09/593,724 filed Jun. 13, 2000, abandoned, and is incorporated in its entirety by reference made herein.

BACKGROUND OF THE INVENTION

In new building construction, the plumbers prefer not to put the finished closure valves in the bottom of tubs, or the finished decorative plate over the overflow outlet at the end of the tub until the project is finished because these elements will be often damaged as the construction project is brought to a close. Further, the piping for both of the outlets needs to be checked for leaks before the inspection process is completed. The test involves running water down the vent for the drain until it reaches a level above the tub and the tester then determines whether any of the piping leaks. Thus, when the testing operation arrives, a plug is put in the bottom drain of the tub and some sort of seal plate is placed at the end of the tub on the overflow outlet.

Existing overflow plates have a center opening therein. There are either two or four small screw holes in the plate adjacent the center opening wherein two of the holes are used to hold the plate to the plumbing fixture. In some cases there is a fitting so that the screw hole is located directly in the middle of the access hole. In that case, that hole is in the way when the testing procedure is implemented. In any event, the testing procedure usually involves stuffing a balloon through the large center opening into the pipe in the wall and the pipe is sealed when the balloon is inflated. Further, existing seal plates normally have to be removed when the decorative plate is put on. Two screws which use the screw openings of the plate typically hold the decorative plate in position.

A more recent version is shown in the U.S. Pat. No. 5,890,241 in which an overflow system for a bathtub has an overflow port and has a drain pipe in connection with the overflow port. A flexible diaphragm is imposed over overflow drain pipe secured to and engages the inner face of the sleeve. Screws extend through the plate which has a center opening. A screw extends through the plate to hold the cap in place. The cap has a conventional side rim extending around the plate and diaphragm. A cut-out portion of the cap provides for water flow. The diaphragm seals the overflow pipe when the system is being tested for leaks with pressurized fluid. Following the tests, when the fluid is removed, the diaphragm is cut or slashed to open the overflow port to provide fluid flow. While this device serves the intended function, it is expensive to make and more cumbersome to assemble.

It is, therefore, a principal object of the invention to provide a method and a means for an overflow assembly for bathtubs and the like which will safeguard the overflow system during construction; prepare the system for testing; and facilitate the final installation of the bathtub hardware.

A further object of the invention is to facilitate the testing procedure of the overflow system before the final installation has taken place, and to permit the assembly of parts without the use of screws, screw holes, and the like.

These and other objects will be apparent to those skilled in the art.

SUMMARY OF THE INVENTION

An overflow system in the bathtub has an overflow port and has a drain pipe in connection with the overflow port. A threaded flange has a stub shoulder on one end which is forced-fitted into a circular sleeve on the overflow port. The threaded flange has exterior threads on its outer surface and a thin diaphragm secured to the end thereof opposite to the stub shoulder. A large sealing washer embraces the outside of the circular flange on the overflow port and extends partially over the threads of the threaded flange. A large internally threaded nut is threadably mounted on the outer end of the threaded flange and compresses the sealing washer against a vertical flange on the port to seal the connection between the threaded flange and the port. A decorative cap is frictionally snapped into engagement with protrusions on the outer surface of the nut. The cap can be removed if needed to permit the plumber to gain access to the diaphragm to cut it open for fluid flow after they system has been tested for leaks, or put in place after the cut takes place.

DESCRIPTION OF THE PREFERRED EMBODIMENT

Figure 1:
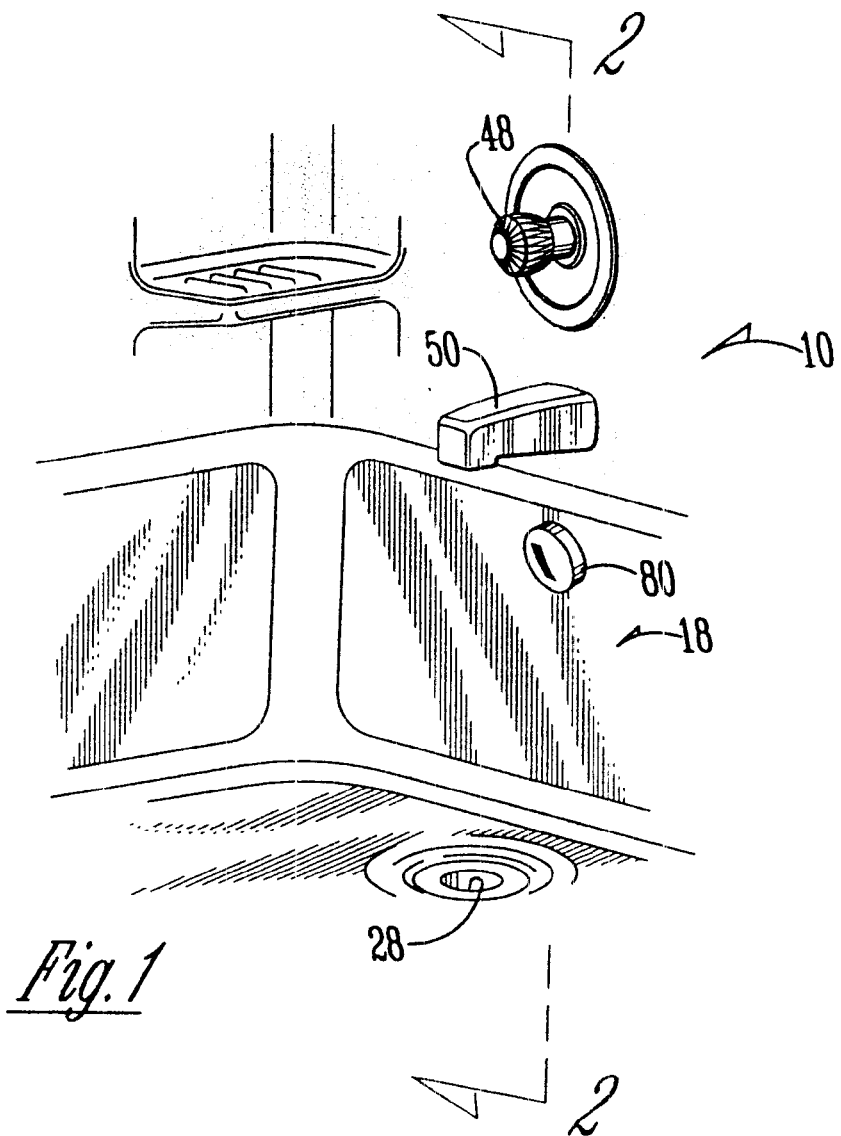
FIG. 1 is a partial perspective view of a conventional bathtub environment utilizing the invention of this application.
Figure 2:
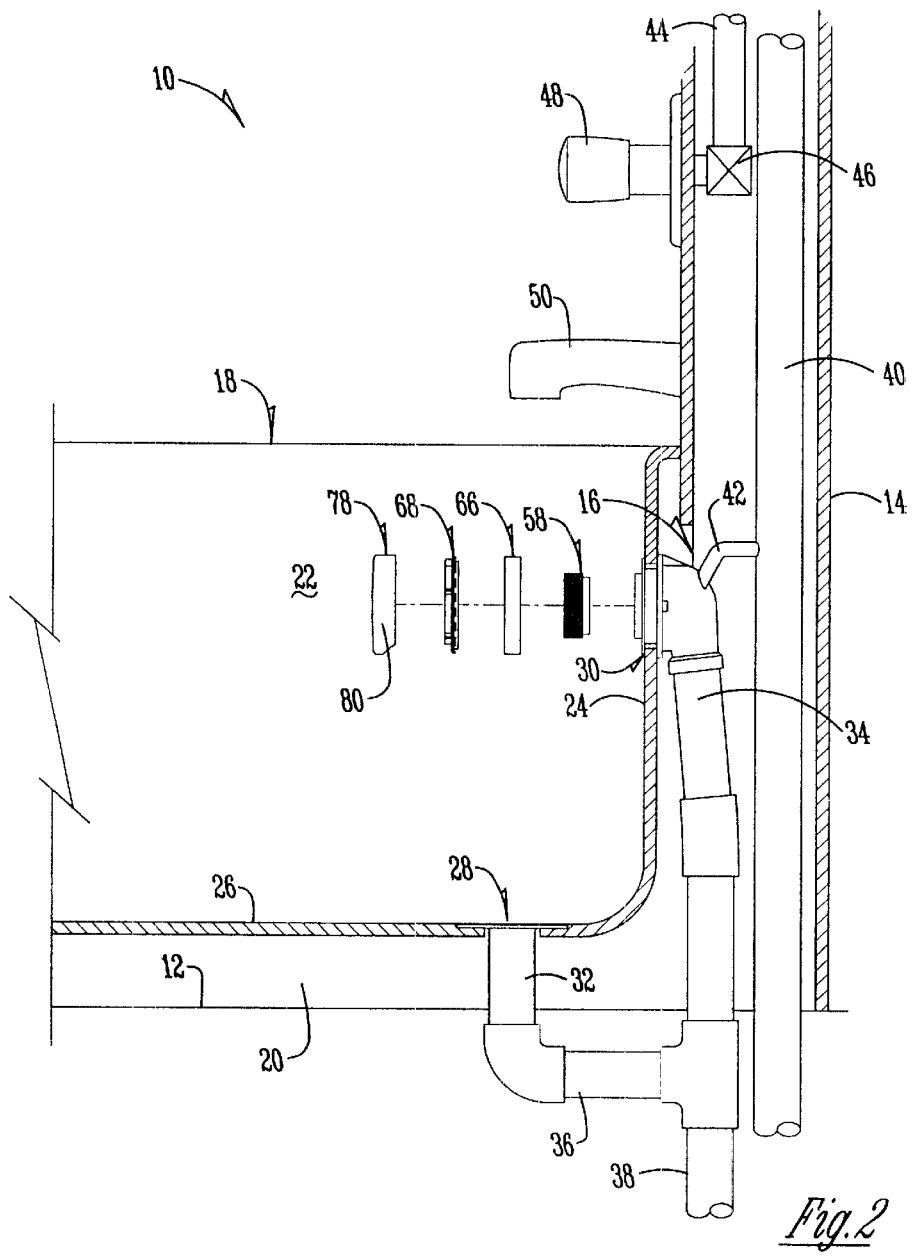
FIG. 2 is a large scale section view taken on line 2—2 of FIG. 1.

With reference of FIGS. 1 and 2, a conventional bathroom structure 10 has a floor 12, and a hollow wall 14 with a wall opening 16 therein. A conventional bathtub ("tub") 18 has a base 20 which rests upon floor 12. Sidewalls 22 extend upwardly from base 20 as does an end wall 24. A bottom 26 dwells in spaced relation to the floor 12.

A conventional drain port 28 is located in bottom 26. A conventional overflow port 30 is located in the end wall 24 (FIG. 2). A vertical drain pipe 32 extends downwardly from drain port 28, and overflow drain pipe 34 extends downwardly from overflow port 30. A horizontal pipe 36 connects pipes 32 and 34. A drain pipe 38 extends downwardly from the junction between pipes 34 and 36.

A conventional vertical vent pipe 40 is located within the hollow wall 14. Pipe 42 interconnects vent pipe 40 and the upper end of overflow drain pipe 34 (FIG. 2). Conventional water pipes 44 extend through hollow wall 40 and are connected to valve 46 which is interconnected to conventional control member 48 and faucet 50.

Figure 3:
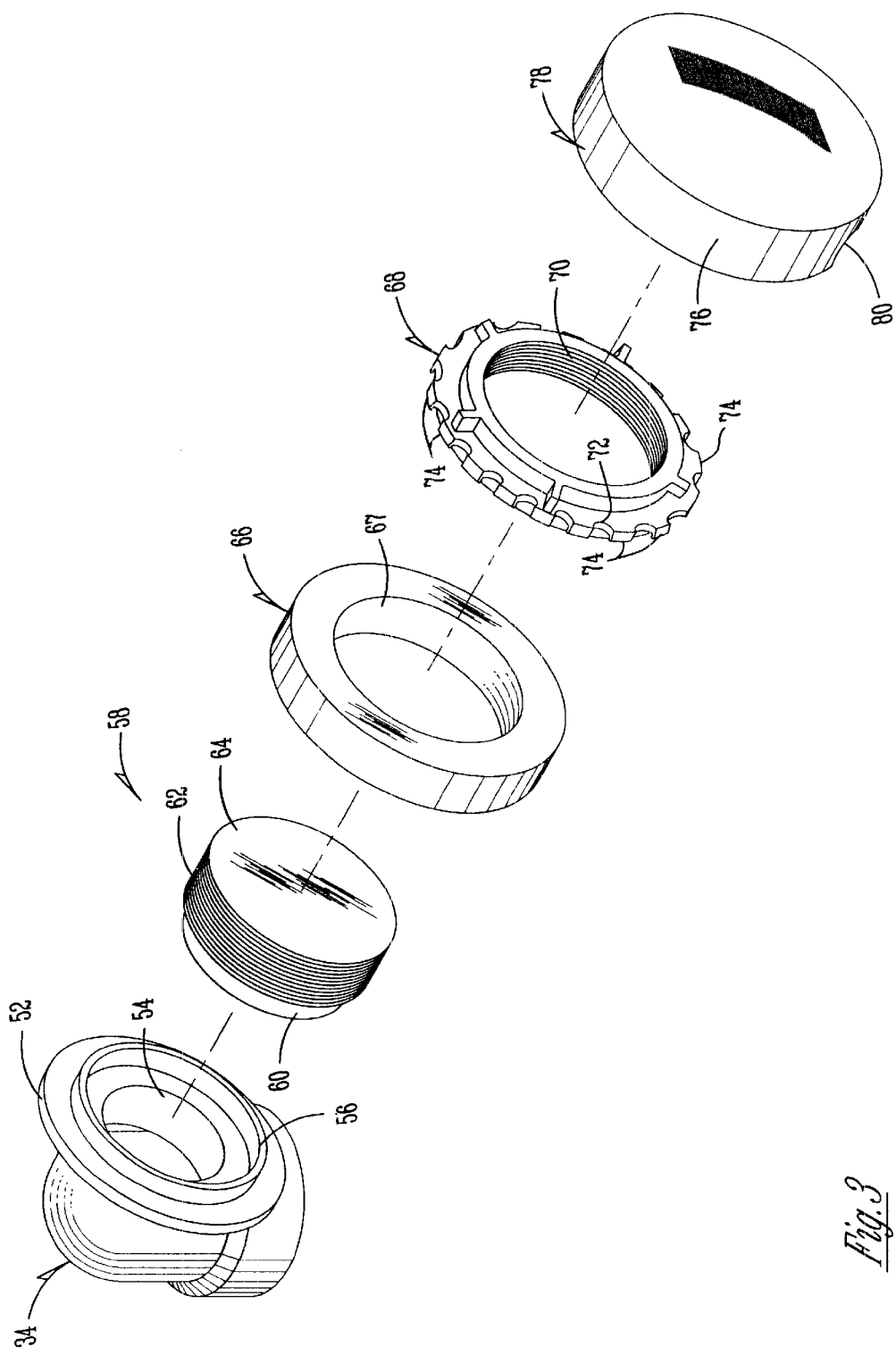
FIG. 3 is a perspective exploded view of the cap, nut, washer, membrane, and upper pipe.
Figure 4:
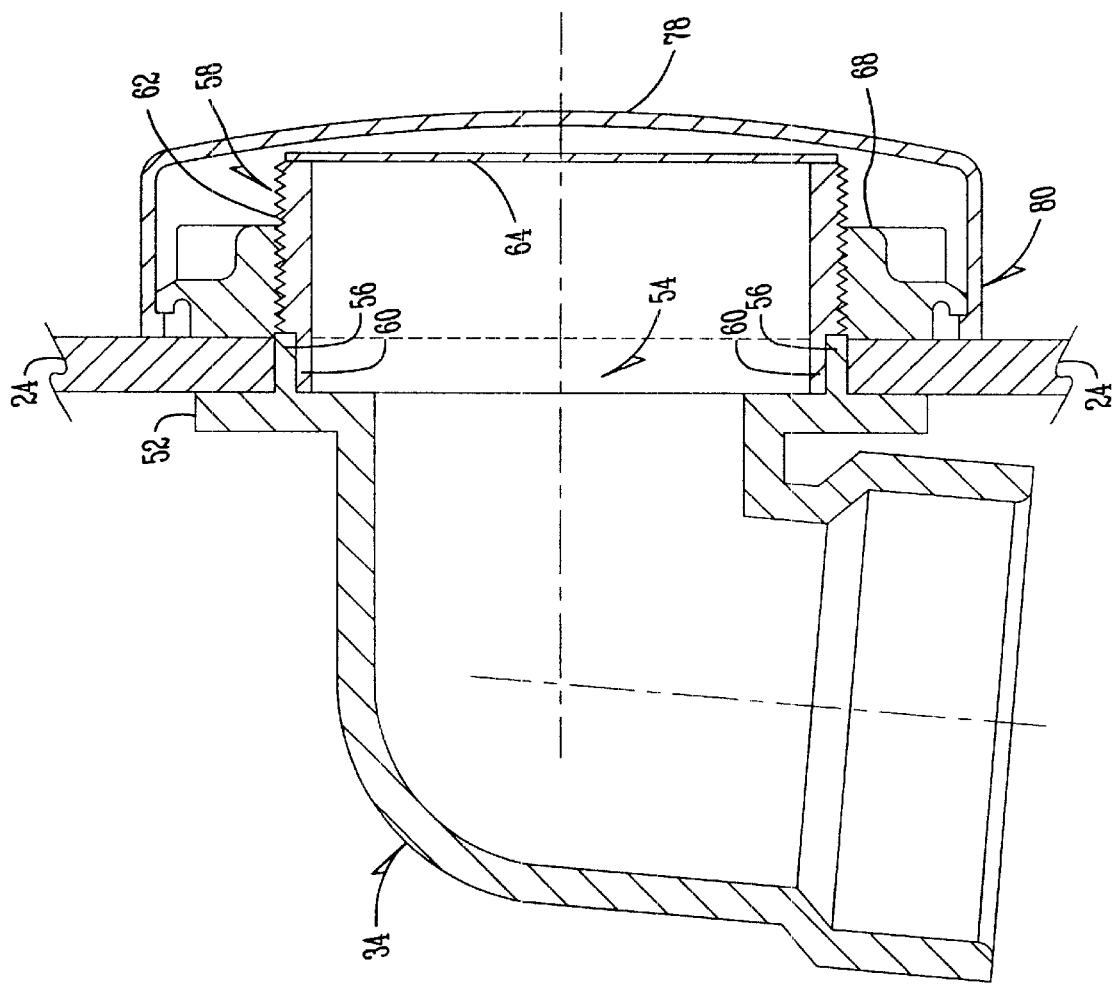
FIG. 4 is a cross sectional view of the assembled components of FIG. 3.

FIG. 3 shows a radial flange 52 formed on the upper end of pipe 34 and has a center opening or port 54. Water can flow through center opening 54 into drain pipe 34. Sleeve 56 extends longitudinally outwardly from the perimeter of opening 54.

A hollow cylindrical fitting 58 has a hollow cylindrical shoulder 60 on its inner end, a threaded outer surface 62, and a thin plastic diaphragm 64 sealed across its outer end. The shoulder 60 has an outer diameter that can be manually frictionally inserted with the inner diameter of flange 56.

A pliable sealing ring or washer 66 has a center bore 67 which can frictionally receive the exterior surface of fitting 58 to engage the radial flange 52 of port 54 to seal the connection between sleeve 56 and shoulder 60. The longitudinal thickness of washer 66 is less than the longitudinal thickness of fitting 58 so that some of the threaded surface 62 adjacent the diaphragm 64 is exposed when the washer 66 is mounted on fitting 58 in the position described above. Thus, the washer 66, when positioned over the fitting 58 and engaging the radial flange 52 extends from the flange 52 over the sleeve 56 to the threaded outer surface of the fitting to seal the assembly at the point where the sleeve meets the edge of the shoulder 60 when the inner end is received within the inner diameter of the sleeve 56.

A nut element 68 has a threaded center bore 70 which is compatible with the threaded outer surface 62 of fitting 58. When nut element 68 is tightened on threaded portion 62, the washer 66 is in tight engagement with flange 52 of port 54. The outer periphery 72 of nut element 68 has a series of radially extending lugs 74 which frictionally detachably engage the inner surface of flange 76 of cap 78. Nut element 68 can be tightened on washer 66 by rotating nut element about the threads of hollow fitting 58 either as positioned within cap 78, or before cap 78 and the nut element 68 are engaged. A notch 80 is located in flange 76 and is adapted to receive overflow water from tub 18 when required to do so. Notch 80 is normally in a 6 o'clock position on flange 76.

It is important to note that diaphragm 64 is of plastic material, as is fitting 58, and is preferably integrally formed with fitting 58 wherein diaphragm 64 and fitting 58 are one unitary component. Diaphragm 64 is a thin circular plate disk that is joined to fitting 58 by its outer peripheral edge engaging the outer peripheral edge of the fitting 58. If the two components are not molded as one unitary structure, the diaphragm 64 could be connected by fusing, hermetically sealed, or by otherwise rigidly attached by its outer peripheral edge to the rearward outer peripheral edges of the fitting by a suitable adhesive. No screws or the like are either required or desired.

In operation, the drainage system comprising the ports 28 and 30, and pipes 34, 36, and 38 are installed as shown in FIG. 3. Vent pipe 40 and connecting pipe 42 are also installed.

Figure 5:
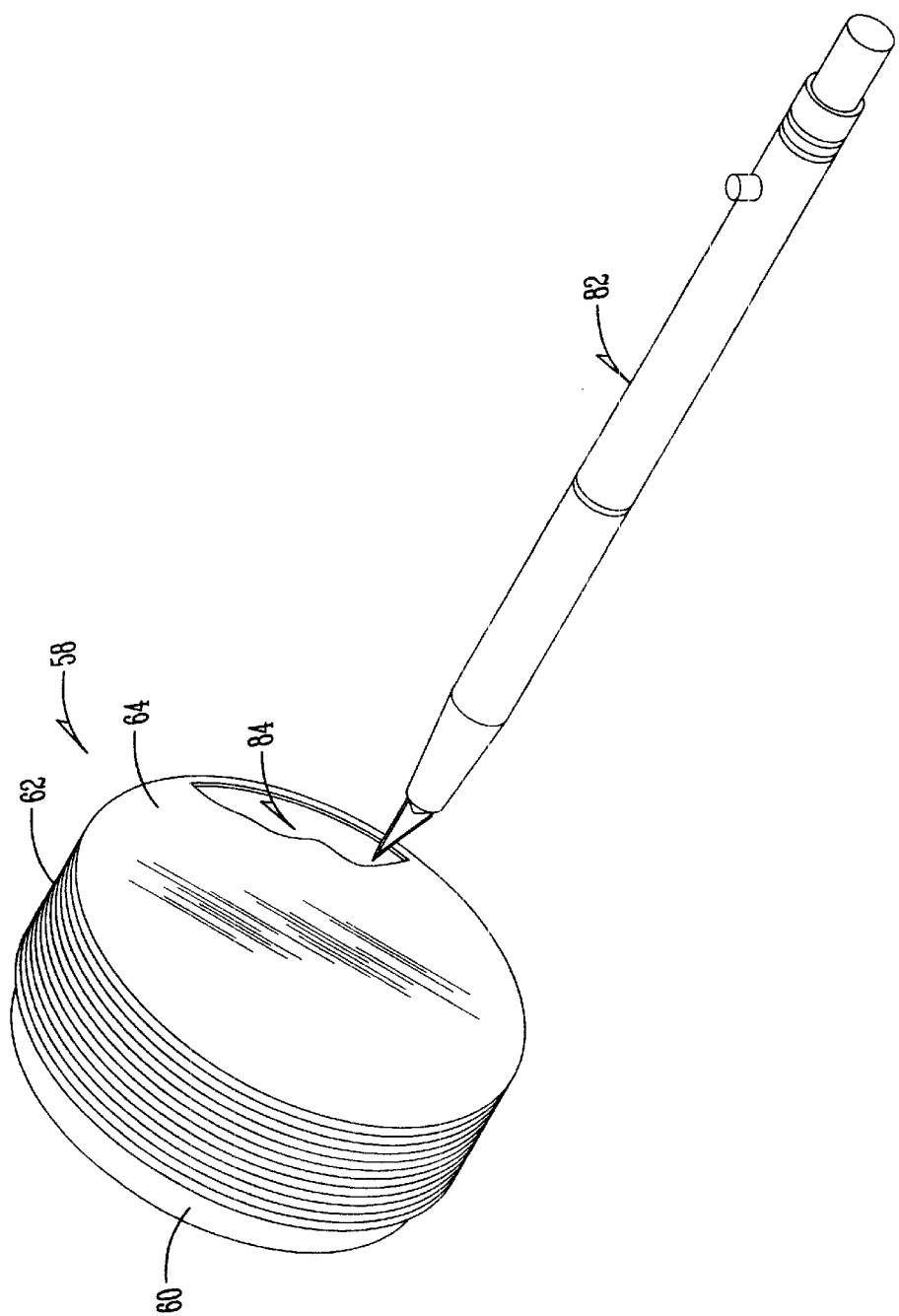
FIG. 5 is a perspective view showing the piercing of the membrane.

In the conventional testing procedure, the port 28 is plugged in any convenient manner. The fitting 58 with diaphragm 64 is installed into drain pipe 34 as described above so there is no fluid access to the upper end of pipe 34 either inwardly or outwardly through overflow port 30. The vent pipe is charged with water at some elevation above pipe 42 so that the building inspectors can check to see if there are any leaks in the system. Having determined that there are no leaks, the water is purged from the system. The plumber can then approach overflow port 30, (since cap 78 is not yet installed) and by using knife 86 or the like, cuts can be made in diaphragm 64 leaving a cutout portion 84 as shown in FIG. 5

It is therefore seen that diaphragm 64 eliminates any need to install or remove any screws or the like for sealing overflow port 30 before or after the testing procedure has taken place. This invention facilitates the testing procedure and reduces the time needed to seal the overflow port 30, and then to open the diaphragm 64 for possible fluid flow.

It is therefore seen this invention will achieve at least all of its stated objectives.

What is claimed is:

1. An overflow assembly for a bathtub, comprising:

the overflow port having a flange and a sleeve that extends outwardly from the flange for receiving an inner end of a hollow fitting having an outer end and threads on an outer surface;

a thin diaphragm sealing the outer end of the fitting;

a nut having a threaded center opening threadably mounted on the fitting to exert pressure towards the flange; and the nut having an outer periphery with a series of radially extending lugs which frictionally detachably engage an inner surface of a flange on a cap which fits over the nut.

* * * * *